June 28, 1927.
E. G. LUENING
1,634,076
LIQUEFACTION OF AIR AND SEPARATION INTO OXYGEN AND NITROGEN
Filed Nov. 3, 1924
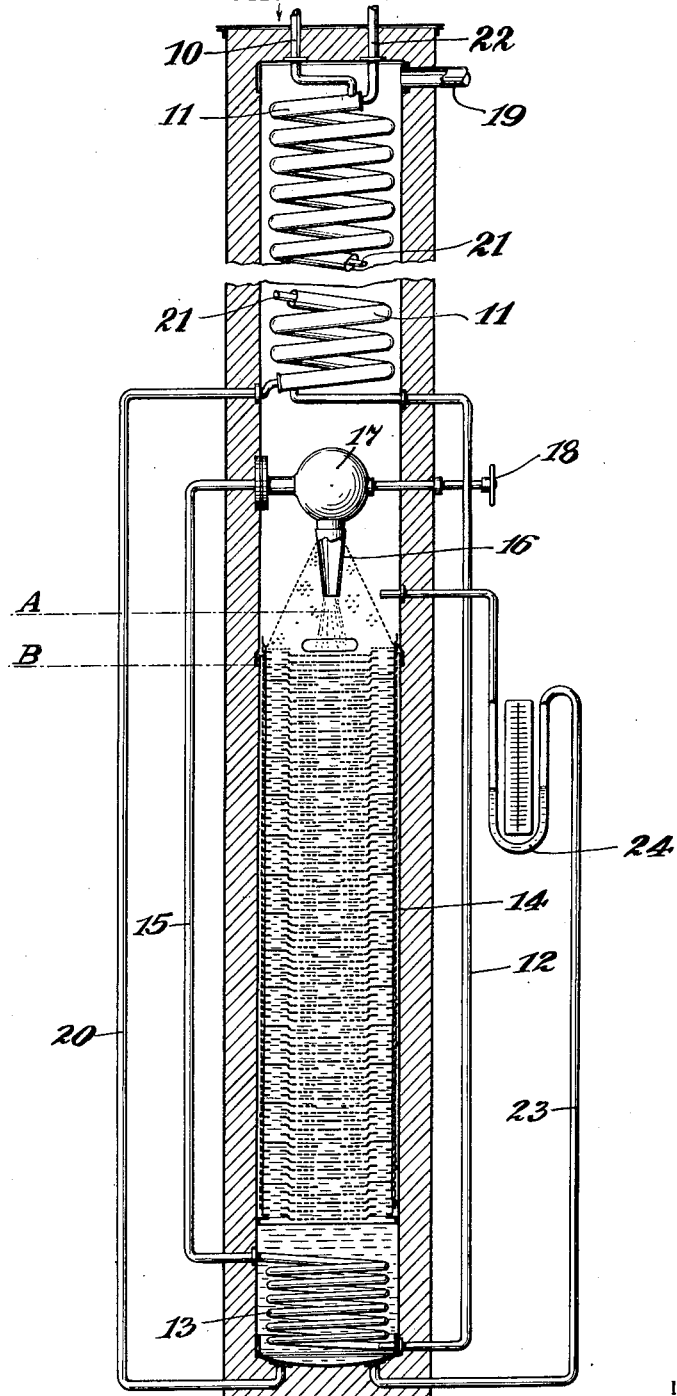
INVENTOR
Eugene G. Luening
BY
Dean, Fairbank, Albright & Hirsch
ATTORNEYS Patented June 28, 1927.

1,634,076

UNITED STATES PATENT OFFICE.

EUGENE GEORGE LUENING, OF CHICAGO, ILLINOIS.

LIQUEFACTION OF AIR AND SEPARATION INTO OXYGEN AND NITROGEN.

Application filed November 3, 1924. Serial No. 747,402.

In obtaining commercially pure oxygen from the air, it is common practice to liquefy the air and fractionally distil the liquid to effect the separation of the oxygen and the nitrogen. The apparatus is so constructed and operated as to obtain the maximum yield of oxygen within a specified limit as to purity. Heretofore substantially perfect or complete separation has not been possible in commercial apparatus. If the extracted oxygen contains not over 2% of nitrogen and rare gases, a large percent of the total oxygen passes out with the main body of the nitrogen. The obtaining of greater purity results in materially smaller yield, and likewise, an increase in yield results in decreased purity.

The main object of my invention is to materially increase the yield and the purity, without increasing the expense of construction, installation or operation of the required apparatus.

In the ordinary apparatus there is provided a fractionating column disposed above a liquid chamber. The liquid to be separated is delivered through an expansion nozzle to the upper end of the column and trickles down through the fractionating column to the liquid vessel, and in counter-current heat interchanging relationship to vapors rising through the column from the liquid vessel. The fractionating column is usually a cylindrical shell filled with distributing material disposed above the level of the liquid in the chamber and serving to break up the descending current of liquid and expose the maximum amount of liquid surface area to the ascending column of vapor, whereby the descending liquid and ascending vapor are brought into intimate contact. The distributing material may be such inert solids as irregular pieces of stone, porcelain, coke, glass beads, transversely disposed perforated or porous plates or baffles, or the like. The air to be separated is delivered through a coil immersed in the liquid chamber, and thereby becomes liquefied in whole or in part, before being delivered to the upper end of the fractionating column. The nitrogen evaporates from the large exposed surfaces of the liquid trickling down through the column and is withdrawn from the upper end of the latter, while the oxygen is withdrawn from the bottom of the liquid chamber which is below the fractionating column. The oxygen and the nitrogen are separately passed in heat interchanging relationship to the incoming compressed air before the latter is delivered to the air liquefying coil which serves as a heating coil for the liquid in the chamber.

In a column of this kind, the pressure is substantially uniform throughout and practically the same at the upper end as at the lower end. The contact between the ascending vapors and the descending liquid is brought about by this division of the liquid into a number of separate bodies of liquid with large surface exposure resulting from the use of the distributing material. The ascending vapor comes into contact with these successive layers or films of liquid and by the exchange of heat the less volatile constituent in the vapors, namely, the oxygen, becomes condensed, and the more volatile constituent, namely, the nitrogen, is evaporated. By proper regulation of the apparatus this constant exchange of constituents between liquid and vapors in successive steps as the vapors pass the successive layers of liquid, will result finally in the collection of substantially pure liquid oxygen at the bottom, but in commercial practice a considerable part of the total oxygen passes out with the nitrogen vapor at the top of the column.

I have discovered that I can obtain more complete separation of the constituents of the air resulting in a larger yield of oxygen and at the same time oxygen of greater purity, if I entirely eliminate the fractionating column as ordinarily constructed and operated. Instead of dividing the liquid into a large number of sections or films in order to expose large liquid contact surfaces during the passage of the liquid through the rising column of vapor, I maintain a column of liquid of very considerable depth through which the vapors formed at the bottom of this liquid column by the heating coil, pass upwardly in properly subdivided condition in a continuous stream.

In carrying out my invention, a portion of the liquid at the bottom of the container is vaporized by the heating coil, and the vapors instead of rising immediately from the surface and coming in contact with successive layers or films of descending liquid, are caused to bubble through a substantially solid column of liquid of considerable height. The vapors being of higher temperature than the liquid, in passing as bubbles up through the liquid column, vaporize the nitrogen from the surrounding liquid while a substantial portion of such oxygen as there may be in the bubbles is recondensed and left within the liquid. In order to prevent undesirable convection currents in the liquid column and in order to break up the bubbles into comparatively small ones distributed uniformly throughout the column, there are preferably employed distributing members of any suitable or conventional form.

The liquid column which is heated only at the lower part should be of sufficient height to permit a substantially complete interchange of temperature between the vapor and the liquid, and consequently substantially complete evaporation and condensation of the constituents during the passage of the vapor from the point of ebullition to the surface of the liquid from which the bubbles escape. In practice, with the pressure of the gases above the column only a few pounds above that of the atmosphere, very efficient results have been secured with a liquid column approximately ten inches in diameter and forty inches in height, and separating approximately 8,000 cubic feet of air per hour. Obviously the height of liquid column necessary is a function of the diameter of the column, the quantity of heat supplied, the quantity of air it is desired to liquefy, and the degree and character of subdivision of the bubbles of vapor passing through the liquid column and the purity of the oxygen desired.

The liquid level of the column should not be above the expansion valve outlet, and should be sufficiently far below said outlet to permit the free escape of the gases vaporized from the stream delivered from said outlet to the liquid column.

The efficiency of the bubble distributing means in breaking up and retarding the bubbles determines to a certain extent the height of column necessary. In any event the height of the column should be such that during the passage of any single bubble from the point of formation to the point of escape, substantially complete interchange of heat and consequently maximum separation takes place. Also it should be of such height that the lower part may be maintained at substantially the temperature of liquid oxygen under the pressure existing at the bottom of the column while the upper part is maintained at the temperature of the incoming freshly liquefied air or air constituents.

I have found from experiments and commercial operation that even if I employ in the liquid column, the ordinary rectification column baffles or plates as the means for retarding and breaking up the rising bubbles, I can increase the yield of oxygen by 20% to 40% over what is possible with the ordinary use of the fractionating column. At the same time I obtained the required purity for the oxygen. Undoubtedly far greater efficiency can be obtained by using distributing means specifically designed and adapted to break up most effectively the bubbles of vapor ascending through the column of liquid.

From the foregoing it will be seen that my improved process may be carried out with certain types of present day commercial apparatus, by using the fractionating column as a liquid column, operating the apparatus in a different manner, and providing suitably located indicating devices to insure the maintenance of the liquid level at the desired point, or within the desired range.

As one novel feature of the apparatus there is provided a differential pressure gauge with connections whereby the difference in pressure between the bottom of the column and a point closely adjacent to the expansion valve outlet may be readily determined at all times. By suitably calibrating this gauge the pressure differential necessary to be maintained between the bottom and top of the column can always be determined and maintained.

Although the heating means employed at the lower end of the liquid column is preferably a coil through which air is passed to liquefy the same before delivery to the expansion valve at the upper end of the liquid column, it will of course be evident that so far as the separation is concerned other sources of heat might be employed. Furthermore, the liquid delivered to the upper end of the column is not necessarily the liquefied air of approximately 80% nitrogen and 20% oxygen, but may be the liquid obtained after a partial separation in other apparatus, and containing a far larger percentage of oxygen. So far as the broad principles of my invention are concerned, it might be employed in connection with the separation of other mixtures of miscible liquids of slightly different boiling points.

In the accompanying drawing I have illustrated somewhat diagrammatically a central vertical section through an apparatus constructed to carry out my invention.

The air after purification and usually after pre-cooling, is delivered under pressure through a conduit 10 to the coil 11 of a heat interchanger, and thence through a conduit 12 to a coil 13 in which the air is partially or wholly liquefied. This coil is located in the lower part of a vessel or column 14 which is of considerable height and which in operation contains the liquefied air. The air is delivered to the upper part of this vessel through a conduit 15 terminating in a delivery nozzle 16. In the conduit and preferably adjacent to the nozzle is an expansion valve 17 which may be controlled from the exterior through an operating handle 18. The nozzle is spaced at a considerable distance above the coil 13 so that the vessel may contain a column of liquid with the coil 13 at the lower end and the nozzle 16 at the upper end.

In starting the operation, the apparatus is so controlled that the liquid delivered through the nozzle 16 accumulates to a level only slightly below the delivery end of the nozzle. My experience indicates that the level should not be materially above that indicated in the drawing by the letter A, which is slightly below the nozzle, and should not be materially below the line B. In other forms of apparatus a wider or more limited range of levels may be permissible, and obviously the level may be varied in accordance with the purity and yield of oxygen which is desired. The liquid bubbles which are formed at the lower end of the column pass up through the liquid and emerge from the surface of the liquid which, as previously indicated, is within the range indicated by the lines A and B. The gas (mainly nitrogen) which emerges from the surface passes through the heat interchanger, and may be delivered through the conduit 19. The liquid (oxygen of the required purity) may be withdrawn from the bottom of the vessel or column through a conduit 20 which leads to a coil 21 in the heat interchanger, and then to the outlet conduit 22.

In order that the bubbles formed on the coil 13 may be broken up and retarded so as to have effective heat interchange with the column of liquid, I preferably employ distributing means within the liquid column and below the surface of the liquid. Such distributing means may be of various different kinds. In the drawing I have diagrammatically indicated perforated plates or baffles as such distributing means. By maintaining a tall column of liquid, the liquid in the vicinity of the coil 13 will be under materially higher pressure than that at the surface or around the expansion valve. As a simple means whereby the level of the liquid may be known to the operator, I provide means whereby the differential pressure at the upper and lower ends of the liquid column may be readily ascertained. As shown, a pipe 23 leads from the bottom of the liquid column to a point above the top thereof, and within this pipe is a U-bend 24 containing mercury or other heavy liquid. The difference in the levels of the mercury on the two legs of the bend will indicate the weight of the column of liquid in the apparatus, and likewise the level of the surface of the liquid. The liquid bubbles formed at the coil 13 will, in passing up through the column of liquid, give up to the liquid the oxygen contained therein, and will evaporate from the liquid some of the nitrogen so that the gas bubbles which escape from the upper surface of the liquid and in the vicinity of the nozzle 16, will be nitrogen with the minimum amount of oxygen therein, while the liquid at the bottom of the vessel and which is drawn off through the conduit 20, will be substantially the pure oxygen.

It is obvious that my invention does not involve the use of any particular kind of a heat interchanger such as that illustrated, nor does it require the interchanger to be formed as a unit with the liquefying and separating apparatus. It is essential that the delivery nozzle 16 be spaced at such a distance above the coil 13 or other heating means that the desired depth of liquid may be maintained and the heat interchanging action take place within the column of liquid, instead of in a stream of liquid trickling down through an ascending column of vapor.

Having thus described my invention, what I claim as new and desire to secure by Letters Patent is:—

1. An apparatus for liquefying air and separating it into oxygen and nitrogen, which includes a liquid column of very much greater height than diameter, an air liquefying coil at the lower end of the column, means for delivering liquid air from said coil to the column at a point close to the upper end of the latter, means within the liquid column for preventing convection currents in the liquid, said means also retarding the upward movement of bubbles from the surface of said coil through the liquid, and means connected to the lower end of the column and to the upper end of the column adjacent to said liquid delivery means for indicating the height of the liquid column.

2. An apparatus for liquefying a gaseous mixture and separating it into constituents of different boiling points which includes a liquid column of very much greater height than diameter, a gas liquefying coil at the lower end of the column, means for delivering liquefied gas from said coil to the column at a point close to the upper end of the latter, means within the liquid column for preventing convection currents in the liquid, said means also retarding the upward movement of bubbles, from the surface of said coil through the liquid, and means connected to the lower end of the column and to the upper end of the column adjacent to said liquid delivery means for indicating the height of the liquid column.

Signed at New York, in the county of New York, and State of New York, this 30th day of October, A. D. 1924.

EUGENE G. LUENING.